(12) United States Patent
Vail et al.

(10) Patent No.: US 6,781,734 B2
(45) Date of Patent: Aug. 24, 2004

(54) MODULATOR ALIGNMENT FOR LASER

(75) Inventors: Edward C. Vail, Fremont, CA (US); Bardia Pezeshki, Redwood City, CA (US); Gideon Yoffe, Fremont, CA (US)

(73) Assignee: Santur Corporation, Fremont, CA (US)

( * ) Notice: Subject to any disclaimer, the term of this patent is extended or adjusted under 35 U.S.C. 154(b) by 128 days.

(21) Appl. No.: 10/114,746

(22) Filed: Apr. 1, 2002

(65) Prior Publication Data

US 2002/0154376 A1 Oct. 24, 2002

Related U.S. Application Data

(60) Provisional application No. 60/280,423, filed on Mar. 30, 2001.

(51) Int. Cl.[7] .................................................. G02F 1/03
(52) U.S. Cl. ...................................... 359/239; 359/245
(58) Field of Search ................................. 359/239, 237, 359/238, 245; 385/15

(56) References Cited

U.S. PATENT DOCUMENTS

| | | | |
|---|---|---|---|
| 3,646,568 A | | 2/1972 | Woywood |
| 4,317,611 A | | 3/1982 | Petersen |
| 4,359,773 A | | 11/1982 | Swartz et al. |
| 4,498,730 A | | 2/1985 | Tanaka et al. |
| 4,537,465 A | | 8/1985 | Sherman et al. |
| 5,136,598 A | | 8/1992 | Weller et al. |
| 5,274,489 A | | 12/1993 | Smith et al. |
| 5,283,796 A | | 2/1994 | Fink |
| 5,289,485 A | | 2/1994 | Mooradian |
| 5,291,502 A | | 3/1994 | Pezeshki et al. |
| 5,378,330 A | | 1/1995 | Li et al. |
| 5,379,310 A | | 1/1995 | Papen et al. |
| 5,420,416 A | | 5/1995 | Iida et al. |
| 5,468,975 A | | 11/1995 | Valster |
| 5,491,576 A | | 2/1996 | Bergano |
| 5,504,609 A | | 4/1996 | Alexander et al. |
| 5,513,030 A | * | 4/1996 | Epworth ..................... 398/198 |
| 5,515,196 A | * | 5/1996 | Kitajima et al. ............ 398/185 |
| 5,519,487 A | | 5/1996 | Atwood et al. |
| 5,612,968 A | | 3/1997 | Zah |
| 5,629,790 A | | 5/1997 | Neukermans et al. |

(List continued on next page.)

FOREIGN PATENT DOCUMENTS

| | | |
|---|---|---|
| EP | 0924821 A1 | 6/1999 |
| FR | 2805092 | 8/2001 |
| JP | 56060088 | 5/1981 |
| JP | 11326707 | 11/1999 |
| JP | 2002246699 | 8/2002 |
| WO | WO 95/13638 | 5/1995 |
| WO | WO 02/13343 A2 | 2/2002 |
| WO | WO 02/37069 A1 | 5/2002 |
| WO | WO 02/37621 A2 | 5/2002 |
| WO | WO 02/058197 A2 | 7/2002 |
| WO | WO 02/013343 A3 | 7/2003 |

OTHER PUBLICATIONS

International Search Report for International Application No. PCT/US02/10527, filed Apr. 1, 2002, mailed Sep. 20, 2002 (3 pages).
International Search Report dated Jan. 21, 2003 for International Application No. PCT/US01/24969 and mailed Jan. 28, 2003 (3 pages).

(List continued on next page.)

Primary Examiner—Scott J. Sugarman
Assistant Examiner—Richard Hanig
(74) Attorney, Agent, or Firm—Christie, Parker & Hale, LLP

(57) ABSTRACT

One or more single mode waveguide devices are fiber coupled such that signals to an optical element affect the coupling of the waveguide device to one or more modulators and to an optical fiber. The optical element or additional optical elements are controlled to adjust the coupling of the waveguide device to a modulator and to an optical fiber.

25 Claims, 6 Drawing Sheets

U.S. PATENT DOCUMENTS

| | | | |
|---|---|---|---|
| 5,689,361 A | * | 11/1997 | Damen et al. ............... 359/284 |
| 5,715,047 A | | 2/1998 | Adamovsky |
| 5,771,253 A | | 6/1998 | Chang-Hasnain et al. |
| 5,777,763 A | | 7/1998 | Tomlinson, III |
| 5,784,183 A | | 7/1998 | Aoki et al. |
| 5,784,507 A | | 7/1998 | Holm-Kennedy et al. |
| 5,793,912 A | * | 8/1998 | Boord et al. ................... 385/37 |
| 5,798,859 A | | 8/1998 | Colbourne et al. |
| 5,825,792 A | | 10/1998 | Villeneuve et al. |
| 5,882,468 A | | 3/1999 | Crockett et al. |
| 5,930,045 A | | 7/1999 | Shirasaki |
| 5,949,544 A | | 9/1999 | Manning |
| 5,953,359 A | | 9/1999 | Yamaguchi et al. |
| 5,959,750 A | | 9/1999 | Eskildsen et al. |
| 5,977,567 A | | 11/1999 | Verdiell |
| 5,978,402 A | | 11/1999 | Matsumoto et al. |
| 5,993,544 A | | 11/1999 | Knauss et al. |
| 5,999,303 A | | 12/1999 | Drake |
| 5,999,545 A | | 12/1999 | Jeon et al. |
| 6,044,705 A | | 4/2000 | Neukermans et al. |
| 6,049,554 A | | 4/2000 | Lang et al. |
| 6,078,394 A | | 6/2000 | Wood |
| 6,091,537 A | | 7/2000 | Sun et al. |
| 6,133,615 A | | 10/2000 | Guckel et al. |
| 6,150,667 A | | 11/2000 | Ishizaka et al. |
| 6,175,668 B1 | | 1/2001 | Borrelli et al. |
| 6,201,629 B1 | | 3/2001 | McClelland et al. |
| 6,212,151 B1 | | 4/2001 | Heanue et al. |
| 6,227,724 B1 | | 5/2001 | Verdiell |
| 6,256,328 B1 | | 7/2001 | Delfyett et al. |
| 6,275,315 B1 | | 8/2001 | Park et al. |
| 6,275,317 B1 | | 8/2001 | Doerr et al. |
| 6,295,308 B1 | | 9/2001 | Zah |
| 6,297,897 B1 | | 10/2001 | Czichy et al. |
| 6,316,764 B2 | | 11/2001 | Heffner et al. |
| 6,327,063 B1 | | 12/2001 | Rockwell |
| 6,350,064 B2 | | 2/2002 | Mitsuda et al. |
| 6,352,376 B2 | | 3/2002 | Walters et al. |
| 6,483,969 B1 | | 11/2002 | Yap et al. |
| 6,516,017 B1 | | 2/2003 | Matsumoto |
| 6,522,793 B1 | | 2/2003 | Szilagyi et al. |
| 2001/0017876 A1 | | 8/2001 | Kner et al. |
| 2001/0036206 A1 | | 11/2001 | Jerman et al. |
| 2001/0050928 A1 | | 12/2001 | Cayrefourcq et al. |
| 2002/0064192 A1 | | 5/2002 | Missey et al. |
| 2002/0076480 A1 | | 6/2002 | Hsieh et al. |

OTHER PUBLICATIONS

"Broadband Lightwave Sources and System", Gayton Photonics Ltd., http://www.infowin.org/ACTS/RUS/PROJECTS/ac065.htm, printed Oct. 17, 2000 (4 pages).

Dellunde, Jaume, "Laser diodes", http://www.geocities.com/jdellund/receng.htm, printed Aug. 8, 2001 (4 pages).

Hunter, D.K., et al., "Guided wave optical switch architectures. Part 1. Space switching", International Journal of Optoelectronics, vol. 9, No. 6, 1994 (pp. 477–487).

Solgaard, O., et al., "Optoelectronic Packaging Using Silicon Surface–Micromachined Alignment Mirrors", IEEE Photonics Technology Letters, vol. 7, No. 1, 1995 (pp. 41–43) (4 pages total).

Li, G.P., et al., "16–Wavelength Gain–Coupled DFB Laser Array with Fine Tunability", IEEE Photonics Technology Letters, vol. 8, No. 1, Jan. 1996 (pp. 22–24).

Gordon, C., "Hybrid Mode–Locked DBR–laser", Multidisciplinary Optical Switching Technology Center, http://www.ece.ucsb.edu/MOST/33.html, (last updated Jan. 22, 1996), printed Aug. 5, 2001 (3 pages).

Daneman, M. J., et al., "Laser–to–Fiber Coupling Module Using a Micromachined Alignment Mirror", IEEE Photonics Technology Letters, vol. 8, No. 3, Mar. 1996 (pp. 396–398).

Wu, M., "Micromachining for Optical and Optoelectronic Systems", Proceedings of the IEEE, vol. 85, No. 11, Nov. 1997 (pp. 1833, 1943–1952).

Jacques, S., "Phase conjugate mirror and diffraction grating yield stable, collimated, coherent, high–power diode laser.", Oregon Medical Laser Center Newsletter, http://omlc.ogi.edu/news/dec97/pclaser.html, printed Apr. 9, 2001, (2 pages).

Shirasaki, M., "Chromatic–Dispersion Compensator Using Virtually Imaged Phased Array", IEEE Photonics Technology Letters, vol. 9, No. 12, Dec. 1997 (pp. 1598–1600).

Kudo, K., et al., "Multiwavelength microarray semiconductor lasers", Electronics Letters, vol. 34, No. 21, Oct. 15, 1998, (pp. 2037–2039).

Kopka, P., et al., "Bistable 2×2 and Multistable 1×4 Micromechanical Fibre–optic Switches on Silicon", Micro Opto Electro Mechanical Systems, MOEMS 1999 (4 pages).

Sahlén, O., "DWDM lasers fashion networks of the future", FibreSystems, Sep. 1999 (pp. 41–44).

"(BW)(OH–MARCONI–COMM–2) Marconi Communications Announces World–Beating Commercial Tuneable Laser at Telecom '99", Press Release, http://www.businesswire.com/cgi–bin/ts_headline.sh?/bw.101199/192842212, Oct. 11, 1999, printed Oct. 17, 2000 (2 pages).

Maluf, N., "Optical switches", An Intoduction to Microelectromechanical Systems Engineering, 2000, pp. 187–190 (3 pages).

Nakano, H., "Technological Trends of Optical Communication Devices for DWDM", NEC Devices Technology International 2000, No. 59 (5 pages).

Liu, F., et al., "Cost–effective wavelength selectable light source using DFB fibre laser array", Electronics Letters, vol. 36, No. 7, Mar. 30, 2000, pp. 620–621, (3 pages).

Hunwicks, A., "Advancing the Optical Component", http://www.telecoms–mag.com/issues/200004/tci/advancing.html, Apr. 2000, printed Oct. 17, 2000 (6 pages).

Pezeshki, B., et al., "12nm tunable WDM source using an integrated laser array", Electronics Letters, vol. 36, No. 9, Apr. 27, 2000 (pp. 788–789).

Howe, P., "Light fantastic", digitalMASS at Boston.com, http://www.digitalmass.boston.com/news/daily/05/22/light_fantastic.html, printed Oct. 17, 2000 (5 pages).

Silverman, S., "Vcs beam big bucks at optics upstarts", Redherring.com, Oct. 9, 2000, http://www.redherring.com/vc/2000/1009/vc–optics100900.html?id=yahoo, printed Oct. 10, 2000 (5 pages).

* cited by examiner

ID
MODULATOR ALIGNMENT FOR LASER

CROSS-REFERENCE TO RELATED APPLICATIONS

This application claims the benefit of U.S. provisional application No. 60/280,423, filed Mar. 30, 2001, which is hereby incorporated by reference as if set forth in full herein.

BACKGROUND

The present invention relates generally to lasers and in particular to controlling fiber coupling between a laser, a modulator, and an optical output.

Tremendous amounts of data can be transmitted quickly across a fiber optic or free space link using lasers. This is typically accomplished by modulating the lasers. In one technique, a single laser is turned on and an external modulator is used to modulate the light with an input data signal. Performance of this technique is usually good, since external modulators can be constructed with controlled and adjusted chirp.

However, coupling the light from the laser, to the modulator, and then to the output fiber, and making sure that this tight coupling is maintained through life of a transmitter is challenging and adds to the cost of such transmitters. Furthermore, some modulators are extremely sensitive to strain and as a result are sometimes packaged on a compliant material, making an integrated laser modulator package even more challenging. Because of the compliant packaging of the modulator, the position of the modulator is often not well controlled and can move around. Therefore, generally, the modulator and laser are generally connected together with an intermediate piece of optical fiber. The laser and the modulator are thus separately fiber coupled, and the two are spliced together. This extra fiber coupling, coupling light from a laser to a fiber optic cable via a modulator, is typically needed but is often a costly step in packaging various waveguide devices for telecommunication applications. In general, any fiber coupling is a costly and time consuming process, on account of the very small optical modes in single mode waveguide devices. Thus, very tight submicron tolerances are often required in the packaging. Typically, when the fiber coupling is maximized, the optical elements are permanently fixed in position. The process is often not very reproducible due to contraction in epoxies or thermal expansion of the components.

BRIEF SUMMARY OF THE INVENTION

The present invention provides an adjustable optical coupling systems and methods for tunable lasers and modulators. In one aspect of the invention, a laser emitting a continuous optical signal and a modulator are provided. Also, an adjustable element steering the optical signal to a position on the modulator is provided. A controller manipulates the adjustable element to maintain the optical signal to a specific position on the modulator.

In another aspect of the invention, a laser is selected from an array of lasers, each laser emitting light at differing wavelengths. Also, an optical path from the laser to a modulator is established and the optical path is adjusted to maximize, balance or otherwise adjust output power from the modulator. Also, a reverse bias current on the modulator is monitored to determine the position of an optical element.

In another aspect of the invention, light from the modulator towards the laser array is prevented. Also, an optical path from the modulator to an optical output is established to maximize, balance and otherwise adjust power of the light from the modulator and a modulator from an array of modulators is selected. In one aspect of the invention, the modulator is selected based on the laser selected, a specific chirp value and/or reducing a bit error rate. In another aspect of the invention, voltage on the at least one modulator is adjusted.

In yet another embodiment, one or more lasers, one or more optical elements and one or more modulators are provided, such that light from a laser is directed into a modulator by one or more optical elements. Also, a controller is provided and is configured to adjust the one or more optical elements to adjust output power of the light directed into the at least one modulator. Also, the controller is configured to adjust the one or more optical elements based on a reverse bias current through the one or more modulators.

In another embodiment, emitting means for emitting light having different wavelengths and modulation means are provided. Also, optical means directs light having a particular wavelength from the emitting means into the modulation means. Furthermore, control means is coupled to the optical means and adjusts the optical means to maximize or balance or otherwise adjust output power of the light directed into the modulation means.

Many of the attendant features of this invention will be more readily appreciated as the same becomes better understood by reference to the following detailed description and considered in connection with the accompanying drawings.

DETAILED DESCRIPTION

DETAILED DESCRIPTION

Figure 1:
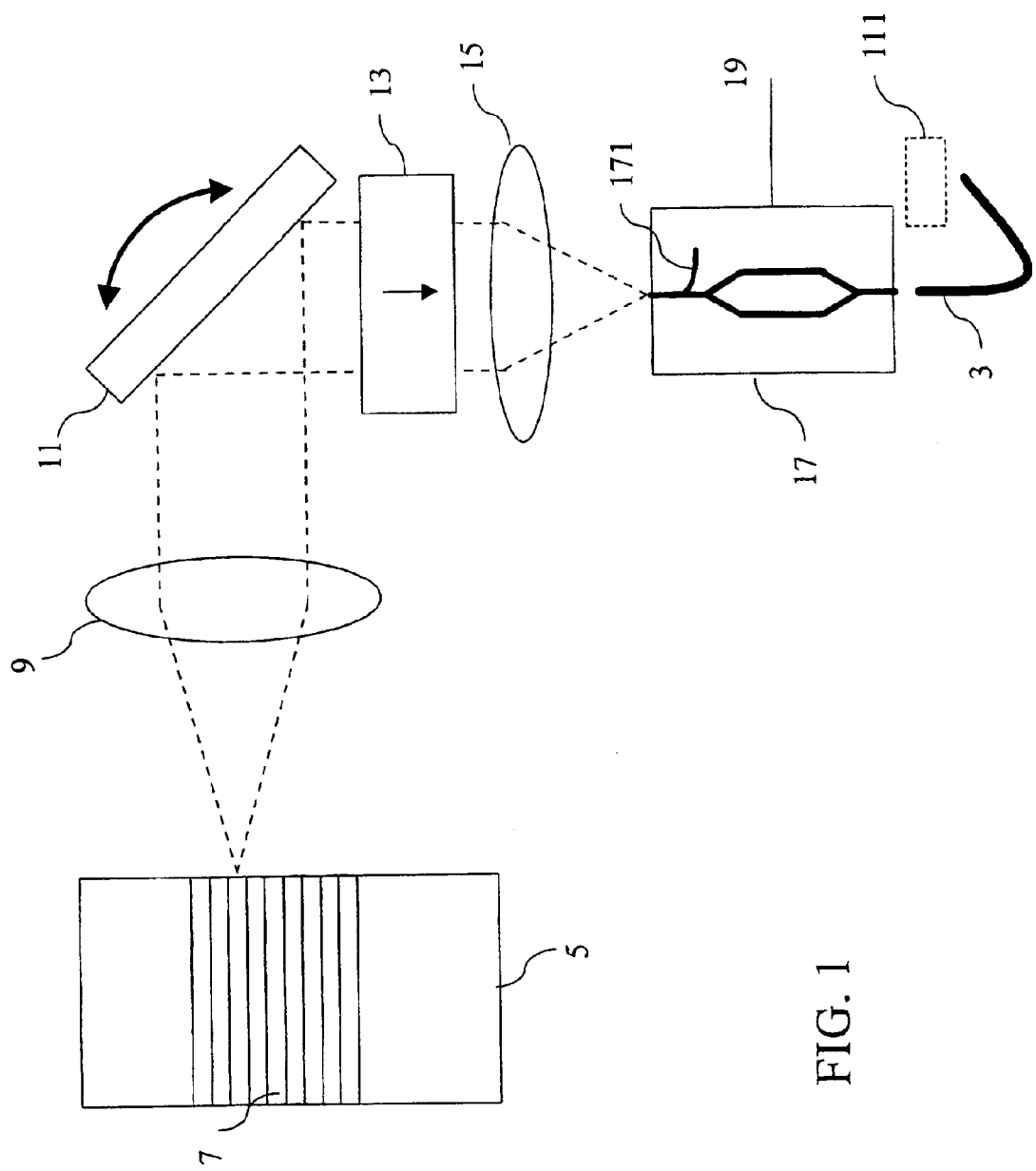
FIG. 1 illustrates a semi-schematic diagram of one embodiment of a modulation system.

FIG. 1 illustrates one embodiment of a modulation system of the invention. A laser array 5 includes a number of individual addressable lasers 7. Each laser is designed to operate at a different lasing wavelength, by, for example, varying the grating pitch in the laser or adjusting the effective index of the optical mode through varying the stripe width or the thickness of the layers that compose the laser. Light from a selected laser is optically coupled, i.e., transmitted to an optical output, e.g., an optical fiber 3. Various structures and controls are available, examples of which are described in U.S. patent application Ser. Nos. 10/000,142 and 10/002,703, the disclosures of which are hereby incorporated by reference.

In the embodiment illustrated in FIG. 1, light from a selected laser is coupled to an optical fiber via a mirror. In particular, light from a selected laser from the laser array 5 is collimated by a lens 9 and strikes a moveable mirror 11. The mirror reflects the light to an optical isolator 13 which passes the light to a lens 15. The lens focuses the light into a modulator 17. The modulator causes the intensity of the light to change in accordance with input data 19 and supplies the modulated light to an optical fiber 3.

The isolator 13 reduces the chirp of the signal. Without such an isolator, as the modulator changes the intensity of the light passing through it, some of the light reflects back towards the laser and thus can change the threshold of the laser slightly. As a result, a change in the carrier density occurs including a change in the refractive index and the wavelength of the laser. Therefore, a desired amplitude modulation causes a parasitic frequency modulation response in the laser, causing a chirp. The isolator, placed between the modulator and the laser, eliminates feedback into the laser and thus removes or reduces the parasitic chirp. With the modulator being a separate chip or at least not on the same chip as the laser array, placement of the isolator between the two is easily performed.

The movable mirror 11 is used to select the laser and to maintain an optimal coupling to the modulator. In one embodiment, a detector 111 is placed after the modulator, such as through a splitter, to monitor or detect the coupled power. In one embodiment, the modulator is a lithium niobate Mach-Zehnder modulator that has a separate waveguide tap 171 for monitoring the power. For instance, a semiconductor photodetector is placed on top of the modulator chip, positioned above the tap to evanescently sample the output power. In this way the detector measures how much power is coupled into the modulator. The output from the detector after the modulator provides feedback for the movable mirror to move and maintain optimal coupling of the selected laser to the modulator.

In some applications, the movable mirror 11 is also used as a variable optical attenuator. For example, in order to balance the powers at different wavelengths in a fiber, at times a reduction in the optical power of one channel might be required. The position of the movable mirror can be varied such that the coupling is not optimal, but a smaller amount of light is transferred to the modulator. For example, the mirror is tilted away from the optimal coupling position. Additionally, many lithium niobate modulators have a second integrated Mach-Zehnder to act as a variable optical attenuator. By adjusting the optical coupling described above, the second section is eliminated and thus reduces the cost and the size of the modulator.

In one embodiment, a single laser is utilized instead of a laser array 3. Generally, coupling a single laser to a modulator via a movable mirror presents advantages, since the mirror compensates for movement and allows low tolerances in the packaging. Additionally, although previously described, other parts or components, such as the isolator 13, improve the overall performance of a transmitter but may be omitted in applications where cost issues dominate the performance factors.

Figure 2:
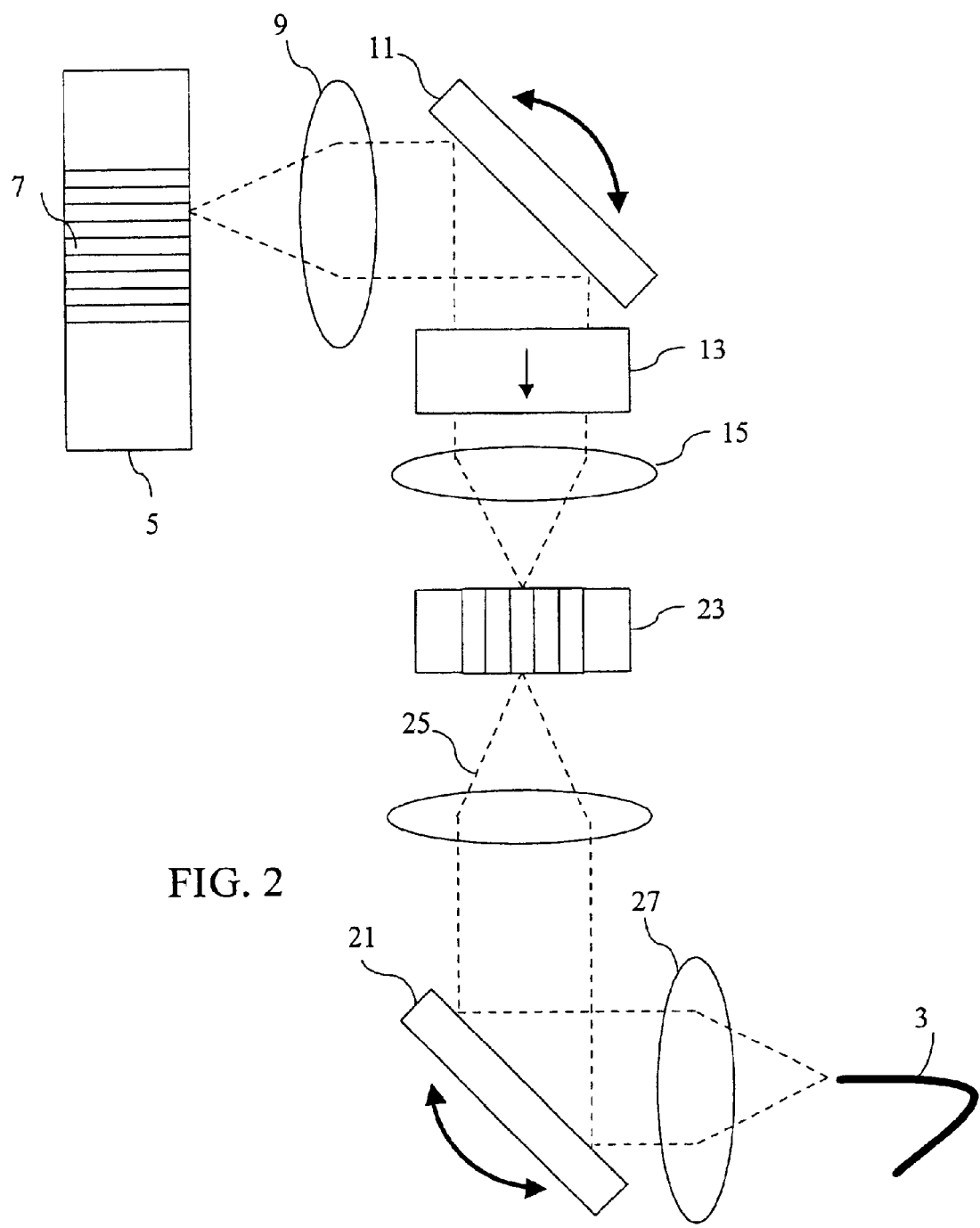
FIG. 2 illustrates a semi-schematic diagram of another embodiment of a modulation system.

The coupling to the output of the modulator, in the embodiment described above, is a standard single mode coupling, where the fiber is epoxied to the end of the modulator chip. In another embodiment, a fixed lens train is utilized to image the output of the modulator onto the optical fiber. In FIG. 2, a second movable mirror 21 is utilized to couple the output from the modulator to the optical fiber. In particular, the light from the modulator is collimated by a lens 25 and strikes the movable mirror. The movable mirror reflects the light to a lens 27 that focuses the light into an optical output 3.

If a movable mirror, such as mirror 11, is used to couple the selected laser into the modulator, the control electronics and drive circuitry to manipulate the first mirror, e.g., mirror 11, is typically present and thus may be used to control the second movable mirror, such as mirror 21. Accordingly, the packaging for the laser array out to the optical fiber would be simplified. Additionally, the second movable mirror is able to compensate for misalignments in the package and dynamically control and maintain the optimal alignment. As such, maintaining the initial placement tolerances and accounting for the rigidity of the parts is greatly relaxed by utilizing the movable mirror 11 and, in one embodiment, by also using a second movable mirror 21.

Figure 3:
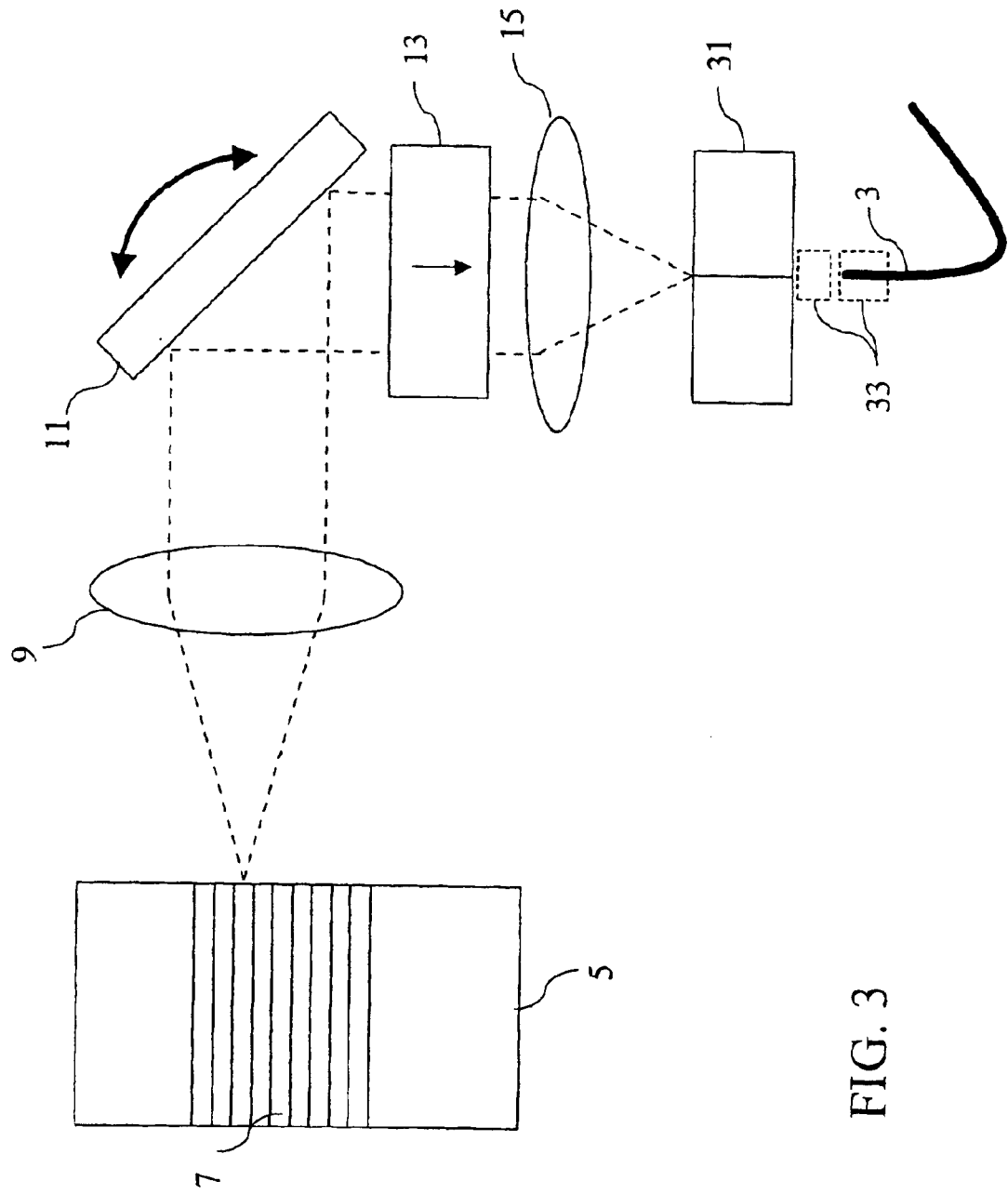
FIG. 3 illustrates a semi-schematic diagram of one embodiment of a modulation system.

In FIG. 3, a laser array 5 with individual addressable lasers 7, lenses 9 and 15, a movable mirror 11 and an isolator 13 is similarly provided as in FIG. 1. However, the light from the selected laser is directed to an electroabsorption modulator 31, such as a semiconductor waveguide modulator. In a semiconductor electroabsorption modulator the intensity of the transmitted light can be varied by controlling the voltage on the modulator. This voltage varies the bandgap of the semiconductor, either through a Franz-Keldysh effect or a Quantum Confined Stark effect, depending on whether the active material is a bulk semiconductor or a quantum well material. In either case, the operating wavelength is close to the bandedge of the modulator material. Generally, among the advantages of the semiconductor electro-absorption modulators compared to their LiNbO Mach-Zehnder counter parts are their smaller size and smaller voltages. However, eletro-absorption modulators typically include narrower optical bandwidth, and a smaller mode size that makes coupling more challenging. The movable mirror simplifies this difficult optical coupling by allowing the light from a selected laser to be optimally coupled to the modulator using, for example, a feedback loop. The reverse bias current on the electroabsorption modulator is used, in one embodiment, as an indicator of the fiber coupling and thereby used to optimize the mirror position of the movable mirror 11.

Referring back to FIG. 2, electroabsorption modulators tend to be narrow band, and as such it is often difficult for a single electroabsorption modulator to cover the entire communication band. Therefore, an electroabsorption modulator array 23 is utilized. The movable mirror 11 allows the use of electroabsorption modulator array, i.e., selects an appropriate electroabsorption modulator, each modulator being optimized for one wavelength range. Accordingly, the movable mirror switches between the modulators depending on which laser is on or selected and the wavelength of the light from the laser. The second movable mirror 21 also adjusts to couple the appropriate modulator to the optical fiber.

The ability to switch between modulators in an array of modulators increases the optical bandwidth. Additionally, different modulators can be designed to deliver different chirps, and depending on the system requirements, the control system can choose between a number of modulators in an array depending on the chirp of each one. Some systems require a small and controlled chirp from the modulator in order to minimize optical nonlinear effects in the fiber. Depending on the configuration of the system, different values of chirp might be required at different times. Thus, use of an array of modulators, such as semiconductor or LiNbO modulators, where the chirp is different between the elements and the electronics that can choose which modulator to use at what time provides the flexibility to operate in multiple configurations for multiple types of systems.

Figure 4:
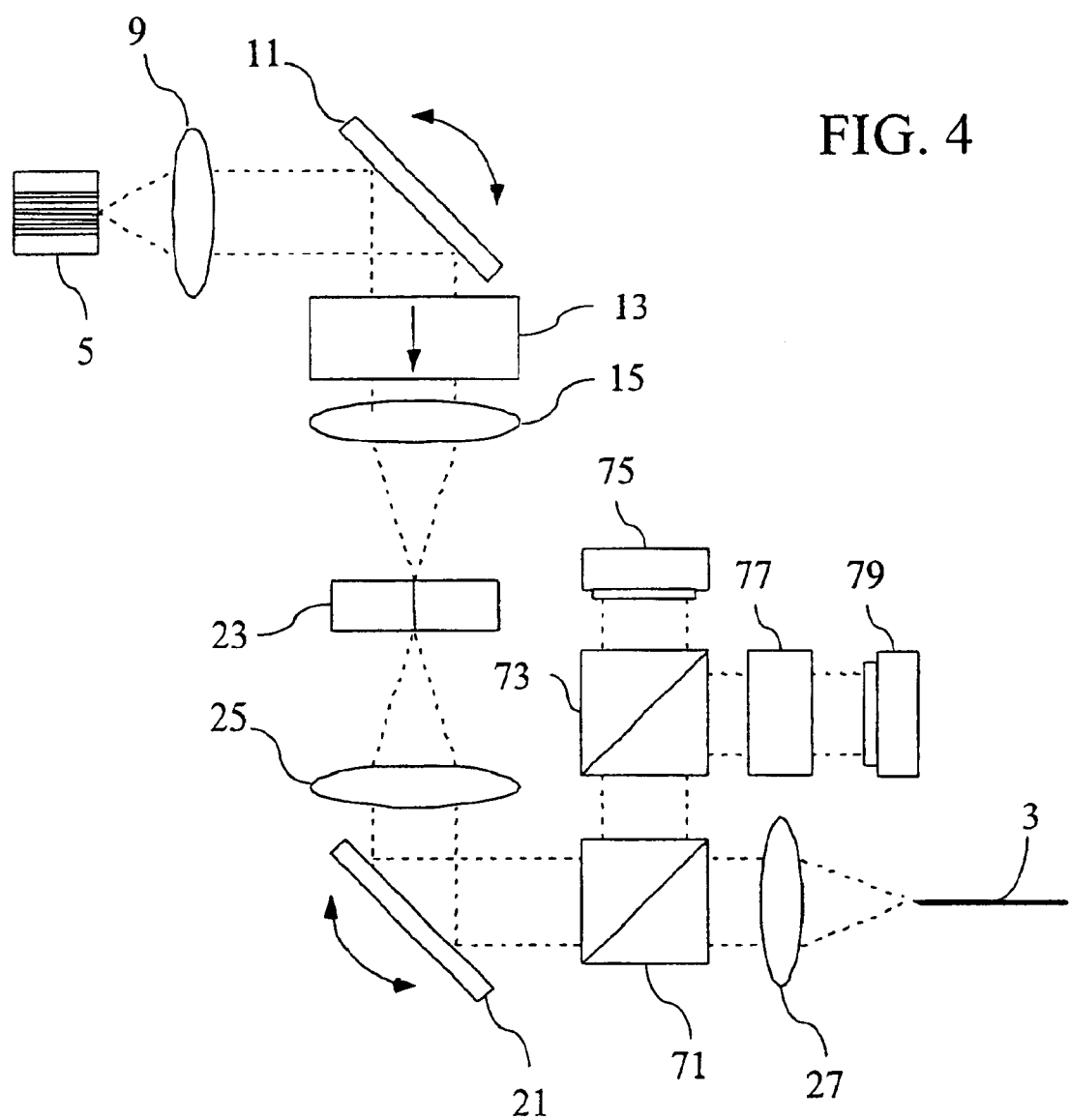
FIG. 4 illustrates a semi-schematic diagram of one embodiment of a modulation system.

In FIG. 4, described in the previous embodiments, a laser or a laser from a laser array emits light that is collimated by a lens 9. The lens strikes a mirror 11 and reflects the light to an isolator 13 which passes the light to lens 15. Lens 15 focuses the light into modulator 23. Additionally, a second movable mirror 21 is utilized to couple the output from the modulator to the optical fiber. As such, the light from the modulator is collimated by a lens 25 and strikes the movable mirror. The movable mirror reflects the light to a lens 27 that focuses the light into an optical output 3.

Prior to the lens 27, a beam splitter 71 is provided. The beam splitter directs a portion of the light from the mirror 21 to, in one embodiment, a position sensitive detector 75, such as a quad detector or one or more photodetectors. The position sensitive detector senses or identifies the position of the mirror 21 and/or the position of the mirror 11. For instance, the light from the splitter is reflected onto the quad detector which generates photocurrent in the four sections A, B, C and D. The ratio of these currents are stored and used for maintaining alignment. For instance, the ratio of the currents generated in sections A and B of the quad detector are measured and stored. Also, the ratio of the currents generated in sections C and D of the quad detector are measured and stored. An electronic control loop is then configured to maintain these ratios during the operation of the device. In one embodiment, generated photocurrents are provided to a controller (not shown) Based on the generated photocurrents, the controller, for example, produces a x axis control signal and a y axis control signal using the control signal, or a signal or signals representative thereof. The x axis control signal and the y axis control signal is used to position the mirror. As such, the mirror 11, mirror 21 or both are positioned to maximize, balance or otherwise adjust power of the light to the optical output.

In one embodiment, a beam splitter (not shown) is also place prior to the modulator to direct a portion of the light to a detector (not shown), such as a quad detector. As such, similar to the previous embodiment, the detector senses or identifies the position of the mirror 11 and controls, or with a controller controls, the mirror to maximize, balance or otherwise adjust power of the light to the modulator.

In another embodiment, a second beam splitter 73 is provided that directs a portion of the light to the position detector 75 and to a wavelength element 77, e.g., an etalon. A power detector 79 detects the output power of the light from the wavelength element, and controls, or with a controller controls, the mirror 21 to maximize, balance or otherwise adjust power of the light to the modulator.

Figure 5:
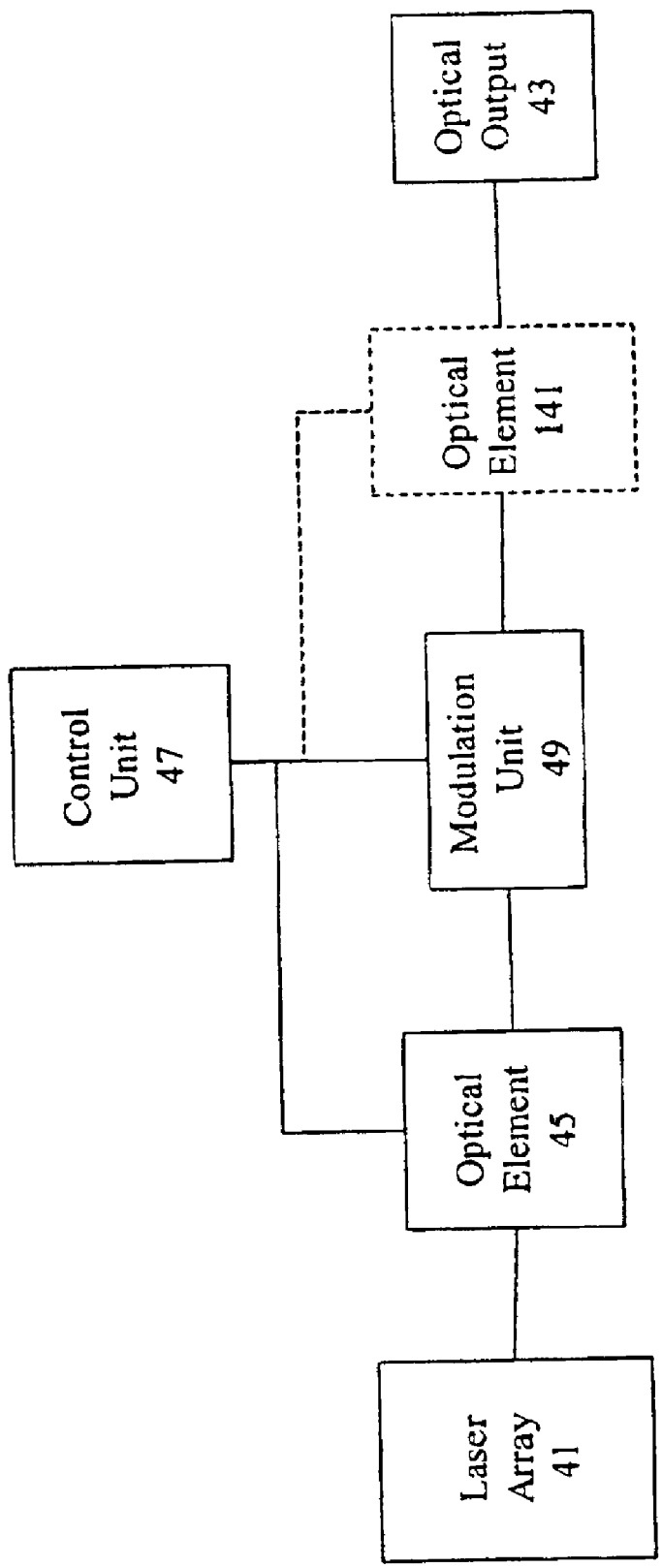
FIG. 5 illustrates a block diagram of one embodiment of a modulation system.

In FIG. 5, a laser is selected from an array of lasers 41 at different wavelengths that is used to increase the tuning range of an output signal. As such, a laser close to the desired wavelength is turned on and then fine-tuned to the desired wavelength using, for example, thermal tuning. In this way wide tuning can be achieved with the excellent performance of narrow tuning structures. The output from the multiple lasers is coupled to an optical output 43, e.g., a single optical fiber, using an optical element 45 and a control unit 47 or controller. For instance, the optical element is controlled by the control unit using active techniques such as MEMS, thermo-optic, liquid crystal, and others or passive techniques such as couplers, combiners, and others which can be integrated along with the laser array.

Additionally, a modulation unit 49 is provided before the optical output to modulate the laser in order to transmit data. The modulation unit includes one or more modulators, such as an electroabsorption modulator or lithium niobate modulator. In one embodiment, the controller selects a modulator based on which the laser is selected. As such, in one embodiment, the controller selects the modulator by manipulating the optical element to direct light from the selected laser to the selected modulation. Additionally, similar to manipulating the optical element to optimally optically couple a laser to the optical output, the controller also manipulates the optical element to ensure optimal coupling between the laser and the modulator and the modulator to the optical output. In one embodiment, a second optical element 141 is also provided and controlled by the controller to further ensure optimal optical coupling of light from the modulator to the optical output.

In one embodiment, the modulation unit is coupled to or attached directly to the fiber in order for the modulation unit to move with the fiber. For instance, in one embodiment, a small length of fiber receives the output of the laser with another end coupled to the modulator unit. The fiber allows for movement of the modulator, with the fiber slightly flexing as the modulator moves.

There are a number of possible configurations and the control thereof of coupling of light from a laser to the modulation unit and the light from the modulation unit to the optical output, some of which are describe above. These configurations compensate for errors in the fiber alignment and loosen the tolerances for the initial placement of parts. Additional configurations and controls to provide optimal coupling of the laser to the optical output are also described in U.S. patent application Ser. Nos. 10/000,142 and 10/002,703, the disclosures of which are hereby incorporated by reference, and can be utilized to provide optimal coupling of the light from the laser to the optical output in accordance with the above description. Likewise, these configurations and the controls can be also utilized to provide optimal coupling of the light from the laser to an optical output which is a modulation unit and an optical fiber or waveguide.

Figure 6:
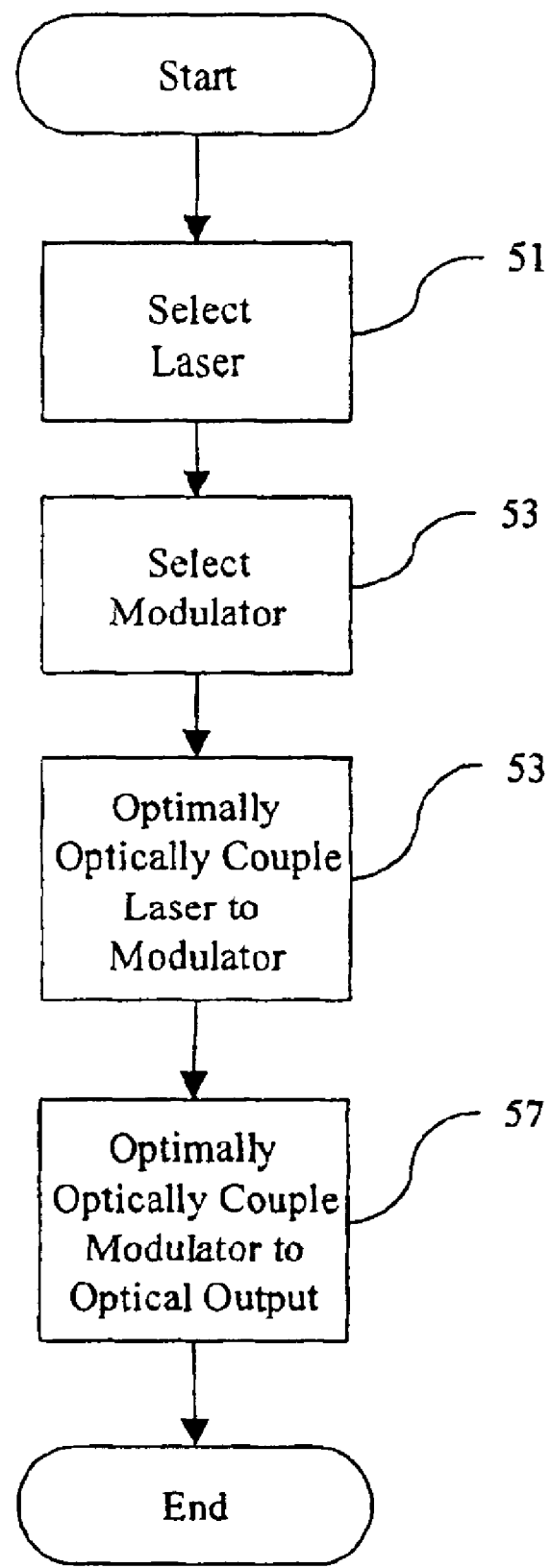
FIG. 6 illustrates a flow diagram of one embodiment of an exemplary operation of providing modulated light to an optical output.

FIG. 6 illustrates an exemplary operational process of providing modulated light to an optical fiber using an embodiment such as shown in FIG. 3. In block 51, the process selects a laser having a desired wavelength. In one embodiment, a control circuit or unit 47 (FIG. 5) is instructed to operate at a particular wavelength and based on its calibrated settings, the control unit selects one laser element from the laser array and, in one embodiment, adjusts the temperature to provide the desired wavelength. Additionally, an optional external wavelength locker 33 (FIG. 3) provides an error signal, such that the light can be tuned precisely to the desired channel. In block 53, the process selects an associated or appropriate modulator. For instance, depending on the wavelength of the light from the selected laser, one of the modulators in an electroabsorption array is selected. In block 55, the process optimally couples the light from the selected laser to the selected modulator. As such, in one embodiment, a first movable mirror is moved to a calibrated position that ensures coupling of the light into the selected modulator. Also, in one embodiment, by monitoring the reverse bias current, the position of the first movable mirror is changed to obtain an optimized coupling to the selected modulator. In block 57, the process optimally couples the light from the selected modulator to the optical output. For example, a second movable mirror moves to a calibrated position such that the selected modulator maintains an optimal position with the optical fiber by using feedback, for example, through a tap after the output or through a quad detector that assures stable pointing accuracy. The process then repeats continually or as so instructed by the control unit or ends.

Accordingly, the present invention provides a system and methodology for controlling and optimizing fiber coupling between tunable lasers and a modulator and to an optical output. Although this invention has been described in certain specific embodiments, many additional modifications and variations would be apparent to one skilled in the art. It is therefore to be understood that this invention may be practiced otherwise than is specifically described. Thus, the present embodiments of the invention should be considered in all respects as illustrative and not restrictive. The scope of the invention to be indicated by the appended claims, their equivalents, and claims supported by this specification rather than the foregoing description.

What is claimed is:

1. An optical transmission apparatus comprising:
   a laser emitting a continuous optical signal;
   a modulator;
   an adjustable element steering the optical signal to a position on the modulator; and
   a controller manipulating the adjustable element to maintain the optical signal to a specific position on the modulator.

2. The apparatus of claim 1 wherein the modulator comprises an electroabsorption modulator.

3. The apparatus of claim 2 further comprising current detector coupled to the modulator; and
   wherein the controller is configured to adjust the adjustable element based on a reverse bias current through the modulator.

4. The apparatus of claim 1 wherein the modulator comprises a lithium niobate modulator.

5. The apparatus of claim 4 further comprising a tap coupled to the modulator; and
   wherein the controller is configured to adjust the adjustable element based on output power of the optical signal from the tap.

6. The apparatus of claim 1 further comprising a detector detecting the specific position of the optical signal; and
   wherein the controller is configured to adjust the adjustable element based on detected position.

7. The apparatus of claim 2 further comprising a detector determining output power of the optical signal; and
   wherein the controller is configured to adjust voltage on the at least one modulator to adjust the output power of the optical signal.

8. The apparatus of claim 1 further comprising an optical isolator between the laser and the modulator.

9. An optical transmission method comprising:
   selecting a laser from an array of lasers, each laser emitting light at differing wavelengths;
   establishing an optical path from the laser to a modulator; and
   adjusting the optical path to adjust output power from the modulator.

10. The method of claim 9 wherein selecting a laser comprises:
    receiving an indication of a desired wavelength;
    choosing a laser from the array of lasers that has the desired wavelength; and
    causing the chosen laser to emit light.

11. The method of claim 9 wherein establishing the optical path further comprises
    determining a position that causes at least one optical element to direct light from the selected laser to the modulator; and
    placing the at least one optical element in the determined position.

12. The method of claim 11 further comprising adjusting the optical path to maximize output power from the selected laser to the modulator.

13. The method of claim 11 further comprising adjusting the optical path to balance output power from the selected laser to the modulator.

14. The method of claim 11 wherein determining a position of the optical element further comprises monitoring a reverse bias current on the modulator to determine the position.

15. The method claim 9 further comprising preventing light from the modulator towards the laser array.

16. The method of claim 9 further comprises focusing the emitted light into the modulator.

17. The method of claim 16 wherein focusing the emitted light into the modulator comprises placing a lens in the established optical path.

18. An optical transmission control apparatus comprising:
    at least one laser from an array of lasers;
    at least one optical element;
    at least one modulator, such that light from the at least one laser is directed into the at least one modulator by the at least one optical element; and
    a controller configured to adjust the at least one optical element to adjust output power of the light directed into the at least one modulator.

19. An optical transmission control apparatus comprising:
    emitting means for emitting light having different wavelengths;
    modulation means;
    optical means for directing light having a particular wavelength from the emitting means into the modulation means; and
    control means coupled to the optical means and for adjusting the optical means to maximize output power of the light directed into the modulation means.

20. An optical transmission control apparatus comprising:
    emitting means for emitting light having different wavelengths;
    modulation means;
    optical means for directing light having a particular wavelength from the emitting means into the modulation means; and
    control means coupled to the optical means and for adjusting the optical means to balance output power of the light directed into the modulation means.

21. An optical transmission control apparatus comprising:
    emitting means for emitting light having different wavelengths;
    modulation means;
    optical means for directing light having a particular wavelength from the emitting means into the modulation means; and
    control means coupled to the optical means and for adjusting the optical means to adjust output power of the light directed into the modulation means.

22. The apparatus of claim 21 further comprising an output means; and
    wherein the optical means directs light from the emitting means to the output means through the modulation means.

23. The apparatus of claim 22 further comprising sensing means for sensing light and is proximate the output means; and wherein the control means is coupled to the sensing means and adjusts the optical means based on light sensed by the sensing means.

24. The apparatus of claim 22 further comprising monitoring means for monitoring current in the modulation means; and wherein the control means is coupled to the monitoring means and adjusts the optical means based on current monitored by the monitoring means.

25. The apparatus of claim 22 further comprising sensing means for sensing light and is proximate the output means; and wherein the control means adjusts the modulation means based on light sensed by the sensing means.

* * * * *